UNITED STATES PATENT OFFICE.

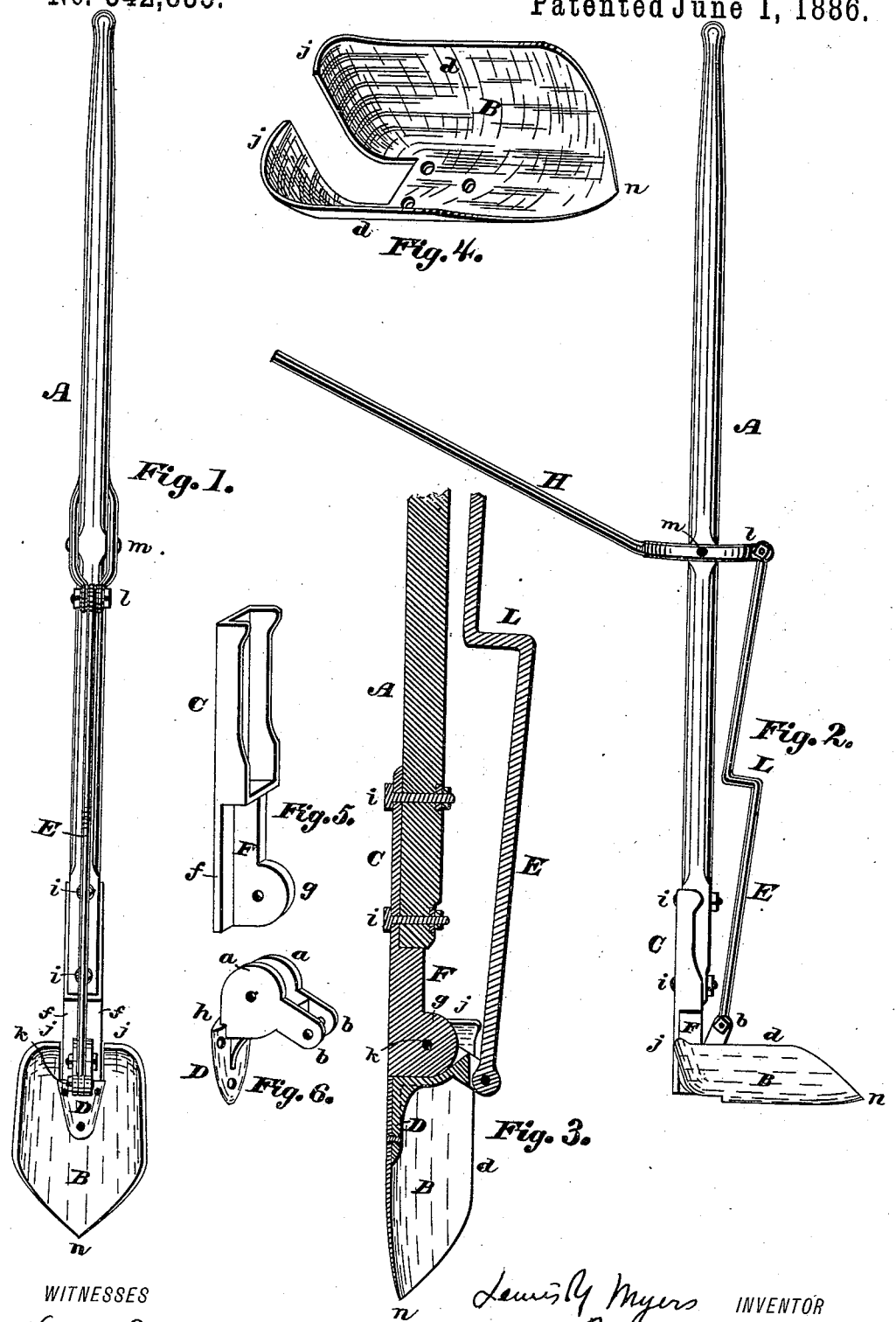

LEWIS Y. MYERS, OF CANTON, OHIO.

POST-HOLE DIGGER.

SPECIFICATION forming part of Letters Patent No. 342,835, dated June 1, 1886.

Application filed September 26, 1885. Serial No. 178,258. (No model.)

*To all whom it may concern:*

Be it known that I, LEWIS Y. MYERS, a citizen of the United States, and a resident of Canton, county of Stark, State of Ohio, have invented a new and useful Improvement in Post-Hole Diggers, of which the following is a full, clear, and exact description, reference being had to the accompanying drawings, making part of this specification.

My invention relates to improvements in post-hole diggers, and especially relates to that class of diggers consisting of a single swinging shovel, and in providing means for operating it.

My invention further relates to and consists in the construction and combination of parts, as set forth in the specification and claims.

Figure 1 is a front elevation of my improved post-hole digger, and Fig. 2 a side elevation showing the shovel B turned to a line at right angles to a line drawn centrally through the handle A. Fig. 3 is a sectional view. Fig. 4 is a view of the side and bottom of the shovel B. Fig. 5 is a view of the handle-socket C and shank F. Fig. 6 is a view of the hinge-plate D and jaws $a\ a$ and levers $b\ b$.

A is the handle, situated centrally over the shovel B, and terminating in an open socket, C, the latter having a shank, F, which is provided with projecting wings $f\ f$ and a hinge-lug, $g$. The plate D is provided with the shoulder $h$, jaws $a\ a$, and projecting arms or levers $b\ b$. The lug $g$ on the shank F is adapted to the space between the jaws $a\ a$, and the wings $f\ f$ rest upon the shoulder $h$. The jaws $a\ a$ and the lug $g$ are broad and strong, so as to give a strong side support to the handle. The lug $g$, when placed between the jaws $a\ a$, should rest on the bottom of the groove formed by the jaws $a\ a$, as shown in Fig. 3. With the parts put together as described and shown, a large surface is provided where the parts come in contact and receive the concussion produced in the operation of digging. The plate D is riveted to the front side of the shovel B, which may be made of a single plate of steel, and formed as shown in Fig. 4, the sides $d\ d$ turned up, forming a concavo-convex body, with the point $n$ rounded in slightly, and the wings $j\ j$ turned in, so as to partly close the upper end of the shovel. The wings $j\ j$ are formed by cutting the middle section of the shovel-plate away, to adapt the shovel to the hinge-plate D and the shank F of the handle-socket C. The handle is secured in the socket C by the through-bolts $i\ i$, and the shank F to the hinge-plate jaws $a\ a$ by the bolt $k$. The lever H may be made of a round bar of iron, bifurcated at one of its ends. The ends of the prongs are perforated and bent or closed in, as shown at 1 in Fig. 1, and adapted to the end of the reciprocating rod E, and have a pivotal connection, $m$, with the handle A. The connecting-rod E has perforations at each of its ends for a bolt-connection—the upper end with lever H, the lower end with the arms $b\ b$, that project from the jaws $a\ a$ of the hinge-plate D. The rod E is provided with a foot-rest, L, formed by offsetting the rod, forming a right-angle section, on which the foot may be placed, and by which the shovel may be forced into the ground.

Having had experience in the manufacture and use of this class of implements, I wish to call especial attention to the form of the shovel and the manner of hinging it to the handle-shank. The advantage of this form of shovel is, that while it will enter the ground as easily as other forms, it can be turned, when in the hole, more easily, and is more effective in removing the earth.

The operation is as follows: The parts are placed in position, as shown in Fig. 2. The handle may be grasped by the operator, one hand embracing the handle near the top, the other hand embracing the handle A and the lever H, holding the lever H and the connecting-rod E parallel, or nearly so, with the handle A; or both hands may grasp the handle and the lever, strike the shovel into the ground, describing a circle, the diameter of which should be a little greater than the length of the shovel. The digger may be used as an ordinary shovel to remove the earth from the upper end of the hole. After the shovel has been driven farther into the ground and a core of earth has been worked loose by turning the lever H to one side and pressing downwardly on the handle A and the lever H, the handle-shank C resting against the wall of the hole, the shovel may be forced by the lever H and its connection with the arms $b\ b$ into a position across the hole to a line at right angles with the handle, and in this position may be used to raise the earth from the hole.

I am aware that shovels have been hinged to the lower end of a handle, and for the purpose of forming a post-hole digger I do not broadly claim hinging a digging-shovel to a handle, but the method of construction in detail and the combination of parts, as described and set forth.

I am also aware that it is not broadly new to cut a section from the rear end of a shovel-blank and then secure the edges on opposite sides of the cut-away portion together.

What I claim, and desire to secure by Letters Patent, is—

1. The combination, in a post-hole digger, of the handle-socket C, having the shank F, projecting wings $ff$, and projecting lug $g$, the hinged plate D, having jaws $a\,a$, arms $b\,b$, and the shovel B, substantially as described, and for the purpose set forth.

2. In a post-hole digger, the shovel B, formed from one piece of sheet metal into a concavo-convex body, its upper portion being cut away, and having the wings $j\,j$ turned in, forming rounded corners, and a rectangular opening in the upper end of the shovel, substantially as set forth.

3. In a post-hole digger, the combination of the handle, the hand-lever H, constructed substantially as described, the connecting-rod E, bent to form a foot-rest and connected to the hand-lever, and a shovel pivotally secured to the lower end of the handle and connected to the lower end of the connecting-rod, substantially as set forth.

4. The herein-described post-hole digger, comprising the handle A, handle-socket C, terminating in the shank F, having wings $ff$, projecting lug $g$, hinge-plate D, having jaws $a\,a$, projecting arms $b\,b$, shovel B, as described, connecting-rod E, with foot-rest L, and hand-lever H, for vibrating the shovel in its pivotal connection with handle A, substantially as described, and for the purpose set forth.

In testimony whereof I have hereunto set my hand this 25th day of September, A. D. 1885.

LEWIS Y. MYERS.

Witnesses:
CHAS. R. MILLER,
W. K. MILLER.